(12) United States Patent
Haruna et al.

(10) Patent No.: US 11,345,627 B2
(45) Date of Patent: May 31, 2022

(54) METHOD OF MANUFACTURING OPTICAL FIBER PREFORM AND OPTICAL FIBER PREFORM

(71) Applicant: SUMITOMO ELECTRIC INDUSTRIES, LTD., Osaka (JP)

(72) Inventors: Tetsuya Haruna, Kanagawa (JP);
Masaaki Hirano, Kanagawa (JP);
Yoshiaki Tamura, Kanagawa (JP);
Yuki Kawaguchi, Kanagawa (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 362 days.

(21) Appl. No.: 16/416,718

(22) Filed: May 20, 2019

(65) Prior Publication Data
US 2019/0270662 A1    Sep. 5, 2019

Related U.S. Application Data

(60) Division of application No. 15/384,853, filed on Dec. 20, 2016, now abandoned, which is a continuation of application No. PCT/JP2015/070717, filed on Jul. 21, 2015.

(30) Foreign Application Priority Data

Jul. 22, 2014    (JP) ................. 2014-148557

(51) Int. Cl.
| | |
|---|---|
| *G02B 1/00* | (2006.01) |
| *C03B 37/012* | (2006.01) |
| *C03B 37/018* | (2006.01) |
| *C03C 3/06* | (2006.01) |
| *C03C 13/04* | (2006.01) |
| *C03B 37/014* | (2006.01) |

(52) U.S. Cl.
CPC ...... *C03B 37/01211* (2013.01); *C03B 37/018* (2013.01); *C03B 37/01228* (2013.01);
(Continued)

(58) Field of Classification Search
CPC ...................................................... G02B 1/00
See application file for complete search history.

(56) References Cited

U.S. PATENT DOCUMENTS

| | | |
|---|---|---|
| 5,146,534 A | 9/1992 | Lines |
| 2006/0130530 A1 | 6/2006 | Anderson et al. |

(Continued)

FOREIGN PATENT DOCUMENTS

| | | |
|---|---|---|
| CN | 102730977 A | 10/2012 |
| EP | 2 618 189 A1 | 8/2015 |

(Continued)

*Primary Examiner* — Andrew T Piziali
(74) *Attorney, Agent, or Firm* — Faegre Drinker Biddle & Reath LLP

(57) ABSTRACT

The present invention relates to a method of manufacturing an optical fiber preform for obtaining an optical fiber with low transmission loss. A core preform included in the optical fiber preform comprises three or more core portions, which are each produced by a rod-in-collapse method, and in which both their alkali metal element concentration and chlorine concentration are independently controlled. In two or more manufacturing steps of the manufacturing steps for each of the three or more core portions, an alkali metal element is added. As a result, the mean alkali metal element concentration in the whole core preform is controlled to 7 atomic ppm or more and 70 atomic ppm or less.

5 Claims, 8 Drawing Sheets

(52) U.S. Cl.
CPC .. *C03B 37/01245* (2013.01); *C03B 37/01248* (2013.01); *C03B 37/01446* (2013.01); *C03B 37/01807* (2013.01); *C03B 37/01869* (2013.01); *C03B 37/01892* (2013.01); *C03C 3/06* (2013.01); *C03C 13/045* (2013.01); *C03B 2201/075* (2013.01); *C03B 2201/12* (2013.01); *C03B 2201/20* (2013.01); *C03B 2201/50* (2013.01); *C03B 2203/22* (2013.01); *C03B 2203/29* (2013.01); *C03B 2203/34* (2013.01); *C03C 2201/11* (2013.01); *C03C 2201/12* (2013.01); *C03C 2201/23* (2013.01); *C03C 2201/50* (2013.01); *Y02P 40/57* (2015.11)

(56) References Cited

U.S. PATENT DOCUMENTS

| | | | |
|---|---|---|---|
| 2012/0189262 A1* | 7/2012 | Hirano | C03B 37/01807 385/142 |
| 2012/0263427 A1 | 10/2012 | Hirano et al. | |
| 2013/0188917 A1 | 7/2013 | Hirano et al. | |
| 2015/0370008 A1 | 12/2015 | Tamura et al. | |

FOREIGN PATENT DOCUMENTS

| | | |
|---|---|---|
| EP | 2 910 533 A1 | 8/2015 |
| JP | 2005-537210 A | 12/2005 |
| JP | 2007-504080 A | 3/2007 |
| JP | 2007-516929 A | 6/2007 |
| JP | 2008-536190 A | 9/2008 |
| JP | 2009-190917 A | 8/2009 |
| JP | 2009-541796 A | 11/2009 |
| JP | 2010-501894 A | 1/2010 |
| JP | 2010-526749 A | 8/2010 |
| JP | 2012-162443 A | 8/2012 |
| JP | 2012-229150 A | 11/2012 |
| JP | 2013-107792 A | 6/2013 |
| JP | 2013-142049 A | 7/2013 |
| JP | 2013-174867 A | 9/2013 |
| WO | WO-98/02389 A1 | 1/1998 |
| WO | WO-2004/020357 A2 | 3/2004 |
| WO | WO-2005/021455 A2 | 3/2005 |
| WO | WO-2005/066084 A1 | 7/2005 |
| WO | WO-2006/112918 A | 10/2006 |
| WO | WO-2007/149344 A1 | 12/2007 |
| WO | WO-2008/024255 A2 | 2/2008 |
| WO | WO-2008/136929 A1 | 11/2008 |
| WO | WO-2014/119559 A1 | 8/2014 |

* cited by examiner

| MEAN K-CONCENTRATION IN CORE PREFORM [atomic ppm] | TWICE K-DIPING | | ONE TIME K-DOPING | |
|---|---|---|---|---|
| | K-CONCENTRATION PEAK [atomic ppm] | TRANSMISSION LOSS [dB/km] | K-CONCENTRATION PEAK [atomic ppm] | TRANSMISSION LOSS [dB/km] |
| 0 | | | 0 | 0.162 |
| 5 | 370 | 0.154 | 500 | 0.157 |
| 7 | 500 | 0.153 | 700 | 0.156 |
| 8 | 550 | 0.152 | 830 | 0.155 |
| 13 | 900 | 0.151 | 1,250 | 0.154 |
| 18 | 1,390 | 0.150 | 1,750 | 0.152 |
| 25 | 1,800 | 0.148 | 2,400 | 0.150 |
| 40 | 2,750 | 0.146 | 4,200 | 0.148 |
| 50 | 3,600 | 0.144 | 5,120 | 0.147 |
| 60 | 4,250 | 0.144 | 6,450 | * |
| 70 | 5,000 | 0.142 | 7,100 | * |
| 80 | 5,700 | * | 8,200 | * |

METHOD OF MANUFACTURING OPTICAL FIBER PREFORM AND OPTICAL FIBER PREFORM

CROSS-REFERENCE TO RELATED APPLICATIONS

This application is a continuation application of PCT/JP2015/070717 claiming the benefit of priority of the Japanese Patent Application No. 2014-148557 filed on Jul. 22, 2014, the entire contents of which are incorporated herein by reference.

TECHNICAL FIELD

The present invention relates to a method of manufacturing an optical fiber preform and an optical fiber preform.

BACKGROUND ART

As an optical fiber with reduced Rayleigh scattering and low transmission loss, a silica glass-based optical fiber is known, in which an alkali metal element is added to the core portion (e.g. see Patent Documents 1 to 11). Herein, in a case where an alkali metal element is added to the core portion of an optical fiber preform (corresponding to a core preform), when the optical fiber preform is drawn, the viscosity of the core portion can be reduced. In addition, the network structure of the silica glass is loosened due to a reduction in the viscosity of the core portion, and thus as the concentration of the alkali metal to be added increases, the fictive temperature in the optical fiber decreases. Accordingly, transmission loss in the optical fiber can be reduced.

As a method of adding an alkali metal element to the inside of silica glass, a diffusion method is known (e.g. see Patent Documents 1 and 2). This diffusion method is a method in which while introducing the raw material vapor of, for example, an alkali metal element or an alkali metal salt, a raw material, in the inside of a glass pipe, the alkali metal element is diffused and added to the inner surface of the glass pipe by heating the glass pipe with an external heat source, or by generating plasma in the glass pipe.

As described above, an alkali metal element is added adjacent to the inner surface of a glass pipe, and the diameter of this glass pipe is then contracted by heating. After the diameter contraction, for the purpose of removing transition metal elements such as Ni and Fe simultaneously added when adding an alkali metal element, the inner surface of the glass pipe is etched to only a certain degree of thickness. Because alkali metal elements are diffused faster than transition metal elements, an alkali metal element can be allowed to remain in a glass pipe even when transition metal elements are removed by etching a glass surface to only a certain degree of thickness. After etching, the glass pipe is collapsed by heating to manufacture an alkali metal element-added core rod. A cladding portion with a refractive index lower than the refractive index of a core portion comprising such alkali metal element-added core rod is synthesized on the outer side of the alkali metal element-added core rod to manufacture an optical fiber preform. An optical fiber can be manufactured by drawing the obtained optical fiber preform.

CITATION LIST

Patent Literature

Patent Document 1: Japanese Unexamined Patent Publication No. 2005-537210
Patent Document 2: US 2006/0130530 A
Patent Document 3: Japanese Unexamined Patent Publication No. 2007-504080
Patent Document 4: Japanese Unexamined Patent Publication No. 2008-536190
Patent Document 5: Japanese Unexamined Patent Publication No. 2010-501894
Patent Document 6: Japanese Unexamined Patent Publication No. 2009-541796
Patent Document 7: Japanese Unexamined Patent Publication No. 2010-526749
Patent Document 8: WO 98/002389 A
Patent Document 9: U.S. Pat. No. 5,146,534
Patent Document 10: Japanese Unexamined Patent Publication No. 2009-190917
Patent Document e 11: Japanese Unexamined Patent Publication No. 2012-229150

SUMMARY OF INVENTION

Technical Problem

As a result of investigations on the conventional techniques as described above, the present inventors found the following problems. A core rod forming the whole or part of a core preform is produced by diffusing and adding an alkali metal element to the inner surface of a glass pipe by the diffusion method as described above and collapsing this glass pipe by heating. Because the core rod thus produced becomes the core portion of an optical fiber after drawing or a part of the core portion, the alkali metal element concentration is high in the core portion center (that is, the fictive temperature is low), while the alkali metal element concentration gradually decreases toward the outer side (that is, the fictive temperature becomes higher). Considering the distribution of optical power propagated into the core portion, the fictive temperature in the outer peripheral portion of the core portion with a high optical power cannot be sufficiently reduced due to such distribution of alkali metal element concentration, and thus transmission loss is not reduced. On the other hand, even when a high concentration of alkali metal element is added to a large portion of the core portion of an optical fiber preform at one time for the purpose of reducing transmission loss, crystallization occurs in the core portion. This has caused problems in that the transmission loss of an optical fiber obtained by drawing increases or the yield rate of an optical fiber decreases.

The present invention is made to solve the problems as described above, and an object thereof is to provide an optical fiber preform, from which an optical fiber with low transmission loss can be manufactured by drawing, and a method by which such optical fiber preform can be manufactured.

Solution to Problem

The method of manufacturing an optical fiber preform according to the present embodiment is a method of manufacturing an optical fiber preform, which comprises a core portion having a first core portion comprising an alkali metal element, a second core portion surrounding the first core portion, and a third core portion surrounding the second core portion, and a cladding portion surrounding the core portion and having a refractive index lower than the refractive index of such core portion. In the description, the core portion having the first core portion, the second core portion and the third core portion is described as a "core preform." In addition, such method of manufacturing an optical fiber preform comprises at least a first doping step, a first collapse step, a first diameter-reduction step, a second doping step, a second collapse step, a first build-up step and a second build-up step to solve the problems as described above. In the first doping step, the first doping of an alkali metal element to the inner surface of a first glass pipe is carried out. In the first collapse step, a first intermediate rod is produced from the first glass pipe. In the first diameter-reduction step, a first core rod forming a part of a first core portion is produced from the first intermediate rod. In the second doping step, the second doping of an alkali metal element to the inner surface of a second glass pipe is carried out. In the second collapse step, a second intermediate rod comprising a first glass region to be the first core portion and a second glass region to be the second core portion is produced from the first core rod and the second glass pipe. In the first build-up step, a third intermediate rod comprising the second core rod formed from the whole or part of the second intermediate rod is obtained. In the second build-up step, an optical fiber preform comprising the third core rod formed from the whole or part of the third intermediate rod is obtained.

Advantageous Effects of Invention

According to the present embodiment, an optical fiber with low transmission loss can be obtained by drawing the produced optical fiber preform.

DESCRIPTION OF EMBODIMENTS

Figure 1:
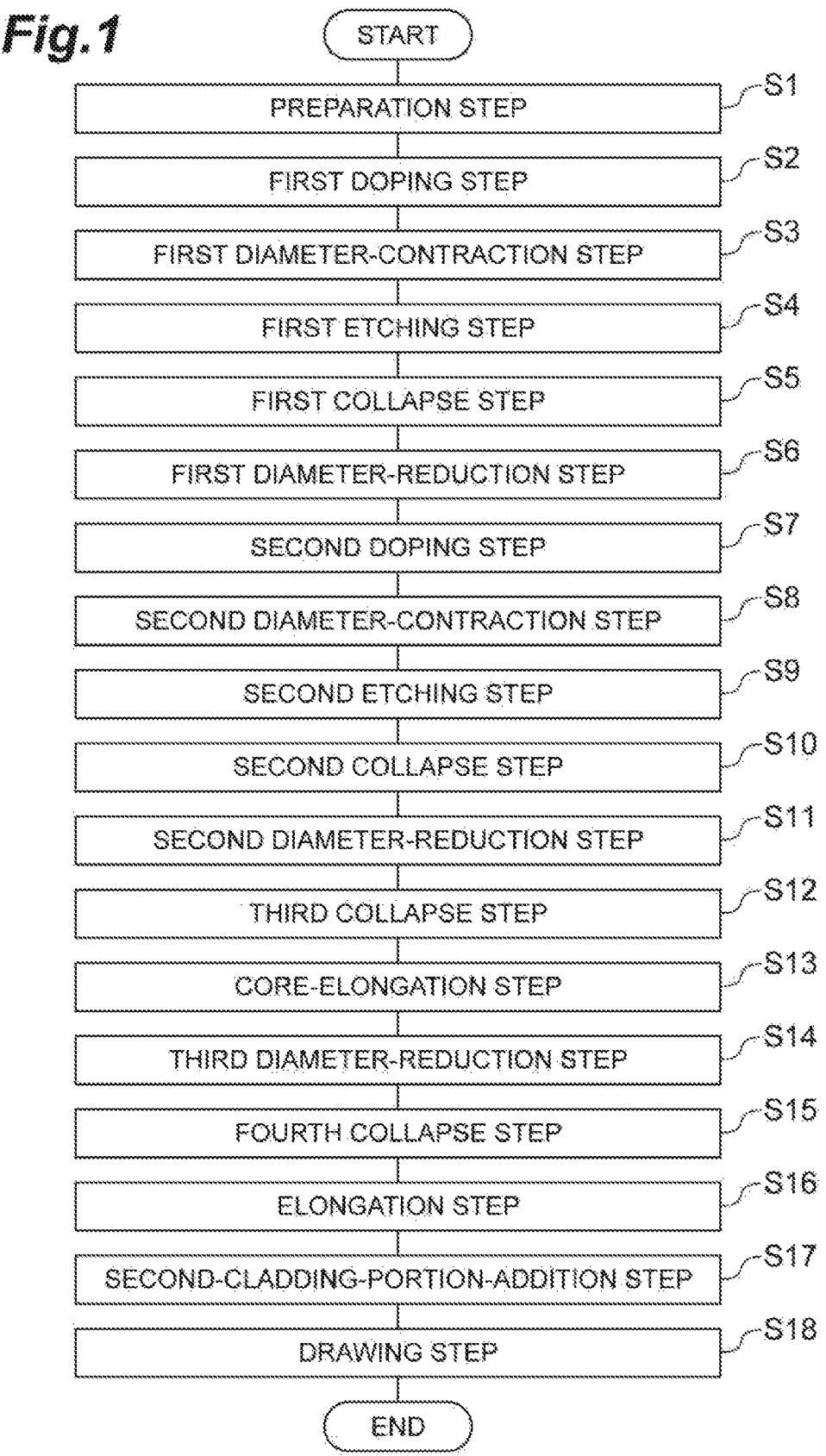
FIG. 1 is a flow chart illustrating the method of manufacturing an optical fiber preform and an optical fiber according to the present embodiment.

Description of Embodiment in Invention of Application

First, the present embodiment in the invention of the application will be listed and described.

(1) The method of manufacturing an optical fiber preform according to the present embodiment is a method of manufacturing an optical fiber preform, which comprises a first core portion comprising an alkali metal element, a second core portion surrounding the first core portion, and a third core portion surrounding the second core portion, a cladding portion surrounding the third core portion and further having a refractive index lower than each refractive index of the first to third core portions, and a core preform is formed from the first to third core portions. Such method of manufacturing an optical fiber preform comprises at least a first doping step, a first collapse step, a first diameter-reduction step, a second doping step, a second collapse step, a first build-up step and a second build-up step. In the first doping step, an alkali metal element is added to the inner surface of a first glass pipe with a mean chlorine concentration of 10 atomic ppm or more and 600 atomic ppm or less. In the first collapse step, the first glass pipe after the first doping step is collapsed by heating. By this first collapse step, a first intermediate rod is produced from the first glass pipe. In the first diameter-reduction step, the diameter of the first intermediate rod is reduced by removing the outer peripheral portion of the first intermediate rod. By this first diameter-reduction step, a first core rod forming a part of the first core portion is produced form the first intermediate rod. In the second doping step, an alkali metal element is added to the inner surface of a second glass pipe with the mean chlorine concentration of 10 atomic ppm or more and 600 atomic ppm or less. In the second collapse step, the first core rod and the second glass pipe are unified by heating with the first core rod inserted into the second glass pipe after the second doping step. By this second collapse step, a second intermediate rod comprising a first glass region to be the first core portion and a second glass region to be the second core portion is produced. In this second intermediate rod, the first glass region has an alkali metal element concentration of 100 atomic ppm or more. In addition, the second glass region has an alkali metal element concentration of 10 atomic ppm or less. In the first build-up step, a third glass region to be the third core portion is added onto the outer periphery of the second core rod formed from the whole or part of the second intermediate rod. This third glass region has an alkali metal element concentration of 10 atomic ppm or less and a chlorine concentration of 2,000 atomic ppm or more and 15,000 atomic ppm or less. By this first build-up step, a third intermediate rod comprising the second core rod is obtained. In addition, in the second build-up step, a fourth glass region to be the cladding portion is added onto the outer periphery of a third core rod formed from the whole or part of the third intermediate rod. By this second build-up step, an optical fiber preform comprising the third core rod is obtained. Herein, the "atomic ppm" is one of units representing the concentration of dopants such as alkali metals and chlorine and fluorine in glass, and means the number of atoms contained in one million molecules of $SiO_2$.

For the above-mentioned structure (1), all structures described below and all combinations of these structures can be applied. That is, the collapse of a first glass pipe in the first collapse step is suitably carried out while introducing oxygen gas in the inside of the first glass pipe in a reduced pressure condition. In addition, the integration of the first core rod and the second glass pipe in the second collapse step is suitably carried out while introducing oxygen gas in the inside of the second glass pipe in a reduced pressure condition. Such method of manufacturing an optical fiber preform can further comprise a second diameter-reduction step carried out after the second collapse step. In this second diameter-reduction step, the diameter of a second intermediate rod is reduced by removing the outer peripheral portion of the second intermediate rod. Accordingly, a second core rod is produced from the second intermediate rod. In addition, such method of manufacturing an optical fiber preform can further comprise a third diameter-reduction step carried out after the first build-up step. In this third diameter-reduction step, the diameter of a third intermediate rod is reduced by removing the outer peripheral portion of the third intermediate rod. Accordingly, a third core rod is produced from the third intermediate rod. Furthermore, the mean concentration of OH group contained in the third core rod is suitably 0.01 wt·ppm or less. Furthermore, an alkali metal element is suitably potassium (K). The oxygen molecule concentration is suitably 30 mol·ppb or more and 200 mol·ppb or less in a part or the whole of a region, in which the alkali metal element concentration is 100 atomic ppm or more, of the third core rod. Herein, "wt·ppm" is one of units representing the concentration of dopants such as OH group in glass, and means the weight [g] of dopants contained in 1,000,000 g of $SiO_2$.

(2) In addition, the optical fiber preform according to the present embodiment is obtained for example by the method of manufacturing an optical fiber preform according to the present embodiment as described above (the method of manufacturing an optical fiber preform prescribed by all of the structures described above and all combinations of these structures). Such optical fiber preform comprises a core preform and a cladding portion surrounding the core preform. The core preform is formed from at least a first core portion comprising the central axis of such core preform, a second core portion surrounding the first core portion, and a third core portion surrounding the second core portion. The first core portion has a maximum alkali metal element concentration of 500 atomic ppm or more and 5,000 atomic ppm or less. In the first core portion, the distribution of alkali metal element concentration along the radial direction of such first core portion has a form in which at least two points, which are separated for a predetermined distance from the center of the cross section of such first core portion (the intersection point of the cross section of the first core portion and the central axis), are local maxima (e.g. FIGS. 2 and 8). The second core portion has an alkali metal element concentration of 10 atomic ppm or less and a chlorine concentration of 10 atomic ppm or more and 600 atomic ppm or less. The third core portion has an alkali metal element concentration of 10 atomic ppm or less and a chlorine concentration of 2,000 atomic ppm or more and 15,000 atomic ppm or less. In the whole core preform, the mean alkali metal element concentration is preferably 7 atomic ppm or more and 70 atomic ppm or less. In addition, the refractive index of a cladding portion is lower than each refractive index of the first to third core portions.

For the above-mentioned structure (2), all structures described below and all combinations of these structures can be applied. That is, an alkali metal element is suitably potassium. The chlorine concentration of the first core portion and the second core portion is suitably 10 atomic ppm or more and 600 atomic ppm or less. The oxygen molecule concentration is suitably 30 mol·ppb or more and 200 mol·ppb or less in a part or the whole of a region, in which the alkali metal element concentration is 100 atomic ppm or more, of a core preform. Herein, "mol·ppb" is one of units representing the concentration of dopants such as oxygen molecule in glass, and means the molecular weight [mol] of dopants contained in 1,000,000 mol of $SiO_2$. The mean concentration of OH group in a core preform is suitably 0.01 wt·ppm or less.

Details of Embodiment in Invention of Application

The method of manufacturing an optical fiber preform and a specific structure of the optical fiber preform according to the present embodiment will now be described in detail with reference to accompanying drawings. It should be noted that the present invention is not limited to these exemplifications, defined by the appended claims, and intended to include any modifications within the meaning and range equivalent to the scope of the claims.

FIG. 1 is a flow chart illustrating the method of manufacturing an optical fiber preform and an optical fiber according to the present embodiment. The method of manufacturing an optical fiber preform according to the present embodiment comprises a preparation step S1, a first doping step S2, a first diameter-contraction step S3, a first etching step S4, a first collapse step S5, a first diameter-reduction step S6, a second doping step S7, a second diameter-contraction step S8, a second etching step S9, a second collapse step S10, a second diameter-reduction step S11, a third collapse step S12, a core-elongation step S13, a third diameter-reduction step S14, a fourth collapse step S15, an elongation step S16 and a second-cladding-portion-addition step S17, and by carrying out these steps in turn, an optical fiber preform is produced. The method of manufacturing an optical fiber according to the present embodiment can manufacture an optical fiber by further carrying out a drawing step S18. The method of manufacturing an optical fiber preform and the method of manufacturing an optical fiber will now be described by way of a specific example of manufacturing conditions.

In the preparation step S1, a first glass pipe is prepared. The first glass pipe is formed from silica-based glass. In the first glass pipe, the chlorine (Cl) concentration is 150 atomic ppm, the fluorine (F) concentration is 6,000 atomic ppm, and the concentration of other dopants and impurities is 10 mol·ppm or less. In addition, this first glass pipe has an outside diameter of 35 mm and an inside diameter of 20 mm.

In the first doping step S2, an alkali metal element is added to the inner surface of the first glass pipe. Specifically, potassium bromide (KBr) is used as an alkali metal raw material and KBr vapor is generated by heating such potassium bromide with a heat source to a temperature of 840° C. While introducing KBr vapor along with 1 slm (1 litter/min in the standard state) of oxygen introduced as a carrier gas in the inside of the first glass pipe, such first glass pipe is heated with an oxyhydrogen burner from the outside so that the surface of the first glass pipe will be 2150° C. The heating in this first doping step S2 is carried out while traversing the oxyhydrogen burner at a velocity of 40 m/min for a total of 15 turns, and by this heating, the potassium element is diffused into the inner surface of the first glass pipe.

In the first diameter-contraction step S3, the diameter of the first glass pipe is reduced by heating. Specifically, while sending oxygen (0.5 slm) in the inside of the first glass pipe to which potassium element has been added, such first glass pipe is heated with an oxyhydrogen burner so that the outer surface of the first glass pipe will be 2250° C. The heating in this first diameter-contraction step S3 is carried out while traversing an oxyhydrogen burner a plurality of times, and the diameter of the first glass pipe is contracted until the inside diameter is 5 mm.

In the first etching step S4, the inner surface of the first glass pipe is etched to remove transition metal elements such as Ni and Fe and OH group simultaneously added when adding an alkali metal element in the first doping step S2. Specifically, the etching to the inner surface of the first glass pipe is gas-phase etching, which is carried out by heating the first glass pipe with an oxyhydrogen burner while introducing a mixed gas of $SF_6$ (0.2 slm) and oxygen (0.5 slm) in the inside of the first glass pipe to which potassium element has been added.

In the first collapse step S5, the first glass pipe is collapsed to produce a first intermediate rod (a glass rod produced in the first collapse step S5). Specifically, oxygen (2 slm) is introduced in the inside of the first glass pipe with the inside of the first glass pipe after the first etching step S4 being under reduced pressure with an absolute pressure of 97 kPa or less. The first glass pipe is collapsed by heating the surface of the first glass pipe to a temperature of 2150° C. with an oxyhydrogen burner in parallel with the oxygen introduction under reduced pressure described above. By this means, a first intermediate rod with a diameter of 25 mm, to which potassium element has been added, is produced.

In the first diameter-reduction step S6, a first core rod with a reduced diameter (a first glass rod manufactured in the first diameter-reduction step S6) is produced by removing the outer peripheral portion of the first intermediate rod produced in the first collapse step S5. Specifically, the first core rod is obtained by hollowing out the center portion with a diameter of 5 mm of the first intermediate rod produced in the first collapse step S5 by boring. The first core rod can be also obtained by removing the outer peripheral portion of the first intermediate rod produced in the first collapse step S5 with the center portion left by grinding. The potassium concentration in the surface portion of the first core rod produced herein is 100 atomic ppm.

In the second doping step S7, potassium element is added to the inner surface of a second glass pipe. The second glass pipe is formed from the same silica-based glass as of the first glass pipe (the refractive indices of the first and second glass pipes are almost identical). Potassium element is added to the second glass pipe in the same manner as in the first doping step S2.

In the second diameter-contraction step S8, the diameter of the second glass pipe is contracted by heating. Specifically, while sending oxygen (0.5 slm) in the inside of the second glass pipe to which potassium element has been added, such second glass pipe is heated with an oxyhydrogen burner so that the outer surface of the second glass pipe will be 2250° C. This heating in the second diameter-contraction step S8 is carried out while traversing the oxyhydrogen burner 6 times. The inside diameter of the second glass pipe after the diameter contraction is about 0.1 to 1 mm larger than the outside diameter of the first core rod produced in the first diameter-reduction step S6.

In the second etching step S9, the inner surface of the second glass pipe is etched to remove transition metal elements such as Ni and Fe and OH group simultaneously added when adding an alkali metal element in the second doping step S7. Specifically, the etching to the inner surface of the second glass pipe is gas-phase etching, which is carried out by heating the second glass pipe with an oxyhydrogen burner while introducing a mixed gas of $SF_6$ (0.2 slm) and oxygen (0.5 slm) in the inside of the second glass pipe to which potassium element has been added.

In the second collapse step S10, the first core rod manufactured in the first diameter-reduction step S6 is inserted in the inside of the second glass pipe after the second etching step S9. A second intermediate rod (a glass rod produced in the second collapse step S10) is then produced by the rod-in-collapse method of unifying the first core rod and the second glass pipe by heating. In the second collapse step S10, specifically, oxygen (2 slm) is introduced in the inside of the second glass pipe with the inside of the second glass pipe being under reduced pressure with an absolute pressure of 97 kPa or less in the same manner as in the first collapse step S5. The rod-in-collapse (the integration of the first core rod and the second glass pipe) is carried out by heating the surface of the second glass pipe to a temperature of 2150° C. with an oxyhydrogen burner in parallel with the oxygen introduction under reduced pressure described above.

In the second diameter-reduction step S11, the outer peripheral portion of the second intermediate rod produced in the second collapse step S10 is removed to produce a second core rod (a second glass rod produced in the second diameter-reduction step S11). The outer peripheral portion of the second intermediate rod can be removed by mechanical or chemical grinding to such outer peripheral portion. In addition, such outer peripheral portion can be removed by physical separation from the center portion of the second intermediate rod (a portion to be a second core rod), which is hollowed out by boring. The diameter of the second core rod produced herein is 16 mm. In addition, the second core rod is not in a state in which potassium element is added as a whole, and potassium element is not purposely added at least in the outer peripheral region of the second core rod. That is, this second core rod has a first core portion (a first glass region located in the inner part of the rod) and a second core portion surrounding the first core portion (a second glass region located in the outer part of the rod), and the first core portion has a chlorine concentration of 150 atomic ppm and a fluorine concentration of 6,000 atomic ppm, and further comprises potassium element. On the other hand, the second core portion has a chlorine concentration of 150 atomic ppm and a fluorine concentration of 6,000 atomic ppm, while the potassium element concentration in such second core portion is 10 atomic ppm or less and the second core portion does not substantially comprise potassium element. Therefore, the refractive index of the first core portion and the refractive index of the second core portion are almost identical. The profile of potassium element concentration in the first core portion has the first concentration peak (the local maximal value) caused by the first doping step around the central axis and further a second concentration peak caused by the second doping step on the circumference surrounding the first peak.

In the third collapse step S12, a third core portion (a third glass region) is added onto the outer periphery of the second core rod. In this step, specifically, a third glass pipe formed from silica-based glass which has a chlorine concentration of 12,000 atomic ppm and does not substantially comprise dopants other than chlorine (having a refractive index higher than the refractive indices of the first and second glass pipes) is prepared. With the second core rod inserted into the prepared third glass pipe, the third glass pipe and the second core rod are unified by heating. By such rod-in-collapse method, the third core portion is added onto the outer periphery of the second core rod to produce a third intermediate rod (a third glass rod produced in the third collapse step S12). This third intermediate rod is a portion to be the core portion of an optical fiber.

In the core-elongation step S13, the third intermediate rod produced in the third collapse step S12 is elongated while being heated. Accordingly, the outside diameter of the third intermediate rod is 27 mm.

In the third diameter-reduction step S14, the outer peripheral portion of the third intermediate rod elongated in the core-elongation step S13 is removed to produce a third core rod with a diameter of 20 mm (a core rod produced in the third diameter-reduction step S14), i.e. a core preform. The outer peripheral portion of the third intermediate rod can be removed by mechanical or chemical grinding to such outer peripheral portion. In addition, such outer peripheral portion can be removed by physical separation from the center portion of the third intermediate rod (a portion to be a third core rod), which is hollowed out by boring.

This core preform (the core rod produced in the third diameter-reduction step S14) has a first core portion, a second core portion surrounding the first core portion, and a third core portion surrounding the second core portion. The first core portion comprises potassium element. In addition, in this first core portion, the chlorine concentration is 150 atomic ppm and the fluorine concentration is 6,000 atomic ppm. In the second core portion, the chlorine concentration is 150 atomic ppm, the fluorine concentration is 6,000 atomic ppm, and the potassium element concentration is 10 atomic ppm or less. In the third core portion, the chlorine concentration is 12,000 atomic ppm, and the potassium concentration is 10 atomic ppm or less. The second core portion and the third core portion do not substantially comprise potassium element. The ratio of the diameter of the first core portion forming a part of the core preform and the diameter of the core preform (20 mm) is 5 times.

The mean concentration of OH group contained in the core preform is 0.01 wt·ppm or less. When an optical fiber is manufactured by drawing an optical fiber preform comprising a core preform by a known method, an increase in transmission loss due to OH group absorption in the 1.38 μm wavelength band is less than 1 dB/km. In addition, the mean concentration of OH group is further preferably 0.001 wt·ppm or less. At this time, an increase in transmission loss due to OH group absorption in the 1.38 μm wavelength band is less than 0.1 dB/km in the manufactured optical fiber.

In the fourth collapse step S15, a first cladding portion is added onto the outer periphery of the third core portion (corresponding to the third core rod as a core preform). In this step, specifically, a fourth glass pipe formed from silica-based glass to which fluorine has been added (having a refractive index lower than the refractive indices of the first to second glass pipes) is prepared. With the core preform inserted into this fourth glass pipe, the fourth glass pipe and the core preform are unified by heating. By such rod-in-collapse method, the first cladding portion is added onto the outer periphery of the third core portion. A relative index difference between the core preform comprising the first to third core portions and the first cladding portion is up to about 0.34%.

In the elongation step S16, a fourth intermediate rod obtained by the integration of the core preform and the fourth glass pipe in the fourth collapse step S15 (a glass rod produced in the fourth collapse step S15) is elongated while being heated. This elongating of the fourth intermediate rod is for the adjustment of the diameter of such fourth intermediate rod to obtain a desired value of the core portion diameter of an optical fiber manufactured in the drawing step S18.

In the second-cladding-portion-addition step S17, a second cladding portion is added onto the outer periphery of the first cladding portion. In this step, specifically, the second cladding portion formed from silica-based glass to which fluorine has been added is synthesized onto the outer periphery of the fourth intermediate rod after the elongation step S16 for example by the OVD method, VAD method or rod-in-collapse method to manufacture an optical fiber preform. In an optical fiber preform manufactured through the above steps, the refractive index of the first core portion and the refractive index of the second core portion are almost identical, the refractive index of the third core portion is higher than the refractive indices of the first and second core portions, and the refractive indices of the first cladding portion and the second cladding portion are lower than each refractive index of the first to third core portions.

In the drawing step S18, a desired optical fiber is manufactured by drawing the optical fiber preform manufactured through the above steps.

Figure 2:
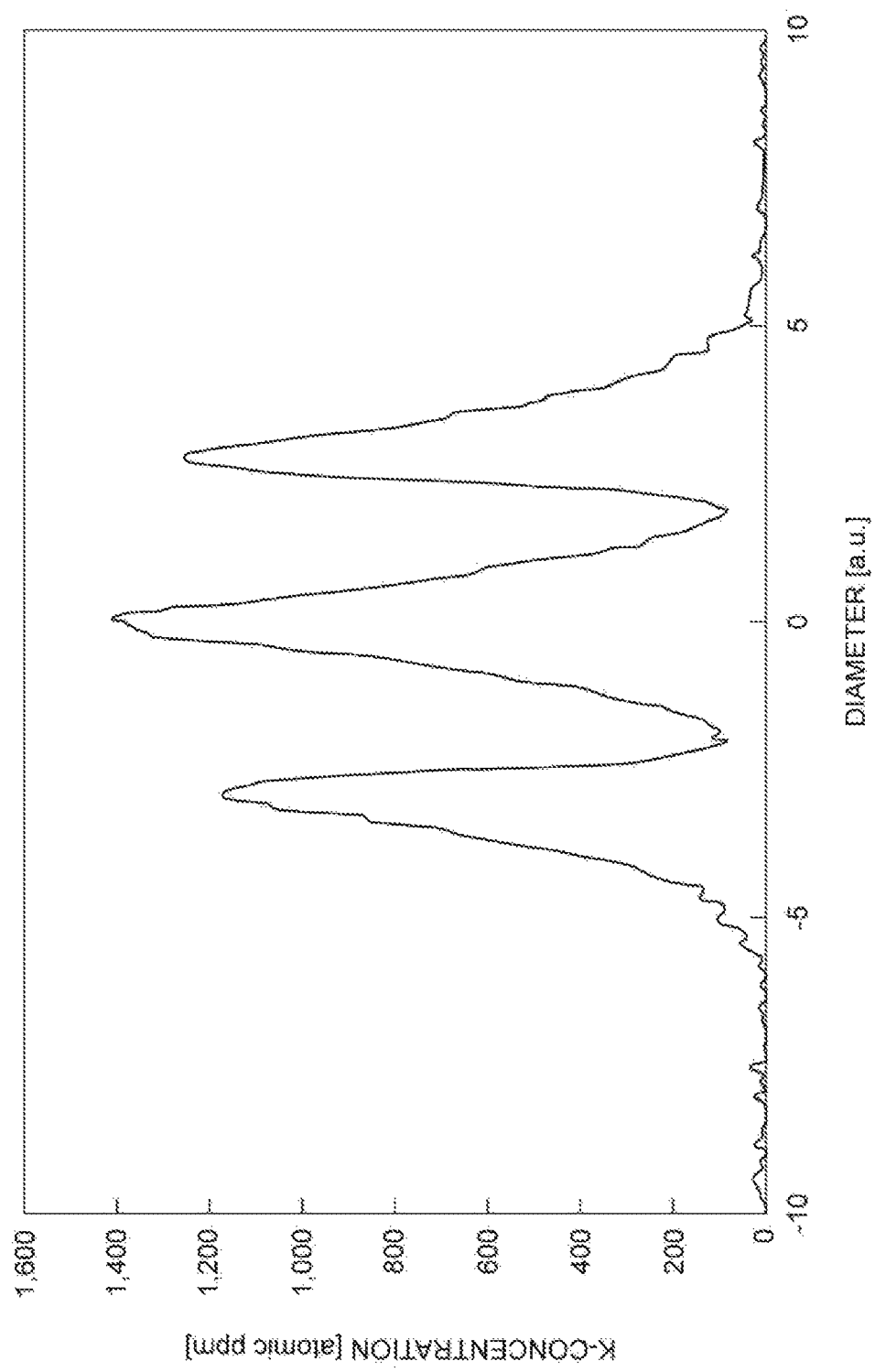
FIG. 2 is an example of the profile of potassium concentration (K-concentration) of a second intermediate rod produced in the second collapse step S10 of the method of manufacturing an optical fiber preform according to the present embodiment (a glass rod produced in the second collapse step S10).

FIG. 2 is an example of the profile of potassium concentration of the second intermediate rod produced in the second collapse step S10 of the method of manufacturing an optical fiber preform according to the present embodiment. In this example, the potassium concentration peak is 1,390 atomic ppm. In a core preform forming a part of the manufactured optical fiber preform, the mean potassium concentration is 18 atomic ppm, and the potassium concentration peak is 1,390 atomic ppm. The transmission loss of the manufactured optical fiber (the optical fiber after drawing) at a wavelength of 1550 nm is 0.150 dB/km.

In the method of manufacturing an optical fiber preform according to the present embodiment described above, potassium element is added twice, and thus the manufacturing method according to the present embodiment will now be described as a "twice K-doping method." In a method of manufacturing an optical fiber preform in Comparative Example described below, by contrast, potassium is added only once, and thus the manufacturing method according to Comparative Example will now be described as "one time K-doping method."

The method of manufacturing an optical fiber preform in Comparative Example comprises a preparation step S21 (corresponding to the preparation step S1 in FIG. 1), a first doping step S22 (corresponding to the first doping step S2 in FIG. 1), a first diameter-contraction step S23 (corresponding to the first diameter-contraction step S3 in FIG. 1), a first etching step S24 (corresponding to the first etching step S4 in FIG. 1), a first collapse step S25 (corresponding to the first collapse step S5 in FIG. 1), a first grinding step S26 (corresponding to the second diameter-reduction step S11 in FIG. 1), a second collapse step S27 (corresponding to the third collapse step S12 in FIG. 1), a core-elongation step S28 (corresponding to the core-elongation step S13 in FIG. 1), a second grinding step S29 (corresponding to the third diameter-reduction step S14 in FIG. 1), a third collapse step S30

(corresponding to the fourth collapse step S15 in FIG. 1), an elongation step S31 (corresponding to the elongation step S16 in FIG. 1) and a second-cladding-portion-addition step S32 (corresponding to the second-cladding-portion-addition step S17 in FIG. 1), and by carrying out these steps in turn, an optical fiber preform is manufactured. In the method of manufacturing an optical fiber in Comparative Example, an optical fiber can be manufactured by further carrying out a drawing step S33 (corresponding to the drawing step S18 in FIG. 1). The method of manufacturing an optical fiber preform and the method of manufacturing an optical fiber will now be described with a specific example of manufacturing conditions.

In Comparative Example, the preparation step S21, the first doping step S22, the first diameter-contraction step S23, the first etching step S24 and the first collapse step S25 are the same as the preparation step S1, the first doping step S2, the first diameter-contraction step S3, the first etching step S4 and the first collapse step S5 in the present embodiment (FIG. 1), respectively.

In the first grinding step S26, the outer peripheral portion of a first intermediate rod (a glass rod) produced in the first collapse step S25 is ground to produce a first core rod (a first glass rod). The diameter of the first core rod produced herein is 16 mm. In addition, the first core rod is not in a state in which potassium element is added as a whole, and potassium element is not purposely added at least in the outer peripheral region of the first core rod. That is, this first core rod has a first core portion (a first glass region located in the inner side of the rod) and a second core portion surrounding the first core portion (a second glass region located in the outer side of the rod), and the first core portion has a chlorine concentration of 150 atomic ppm and a fluorine concentration of 6,000 atomic ppm, and further comprises potassium element. On the other hand, the second core portion has a chlorine concentration of 150 atomic ppm and a fluorine concentration of 6,000 atomic ppm, while the potassium element concentration in such second core portion is 10 atomic ppm or less and the second core portion does not substantially comprise potassium element.

In the second collapse step S27, a third core portion is added onto the outer periphery of the first core rod. In this step, specifically, a second glass pipe formed from silica-based glass which has a chlorine concentration of 13,000 atomic ppm and does not substantially comprise dopants other than chlorine is prepared. With the first core rod inserted into this prepared second glass pipe, the second glass pipe and the first core rod are unified by heating. By such rod-in-collapse method, the third core portion is added onto the outer periphery of the first core rod to produce a second intermediate rod. This second intermediate rod is a portion to be a core preform of an optical fiber.

In the core-elongation step S28, the second intermediate rod produced in the second collapse step S27 is elongated while being heated. Accordingly, the outside diameter of the second intermediate rod is 27 mm.

In the second grinding step S29, the outer peripheral portion of the second intermediate rod elongated in the core-elongation step S28 is ground to produce a core preform with a diameter of 20 mm.

This core preform has the first core portion comprising potassium element, the second core portion surrounding the first core portion, and the third core portion surrounding the second core portion.

In the first core portion comprising potassium element, the chlorine concentration is 150 atomic ppm, and the fluorine concentration is 6,000 atomic ppm. In the second core portion, the chlorine concentration is 150 atomic ppm, the fluorine concentration is 6,000 atomic ppm, and the potassium element concentration is 10 atomic ppm or less. In the third core portion, the chlorine concentration is 12,000 atomic ppm, and the potassium concentration is 10 atomic ppm or less. As described above, the second core portion and the third core portion do not substantially comprise potassium element. The ratio of the diameter of the first core portion forming a part of a core preform and the diameter of the core preform (20 mm) is 5 times.

In the third collapse step S30, a first cladding portion is added onto the outer periphery of the third core portion. In this step, specifically, a third glass pipe formed from silica-based glass to which fluorine has been added is prepared. With the core preform inserted into this prepared third glass pipe, the third glass pipe and the core preform are unified by heating. By such rod-in-collapse method, a first cladding portion is added onto the outer periphery of the third core portion. A relative index difference between the core preform comprising the first to third core portions and the first cladding portion is up to about 0.34%.

In the elongation step S31, a third intermediate rod obtained by the integration of the core preform and the third glass pipe in the third collapse step S30, is elongated while being heated. This elongating of the third intermediate rod is for the adjustment of the diameter of such third intermediate rod to obtain a desired value of the core portion diameter of an optical fiber manufactured in the drawing step S33.

In the second-cladding-portion-addition step S32, a second cladding portion is added onto the outer periphery of the first cladding portion. In this step, specifically, a second cladding portion formed from silica-based glass to which fluorine has been added is synthesized on the outer periphery of the third intermediate rod after the elongation step S31 for example by the OVD method, VAD method, or rod-in-collapse method to manufacture an optical fiber preform.

In the drawing step S33, the optical fiber preform manufactured through the above steps is drawn to manufacture an optical fiber.

Figure 3:
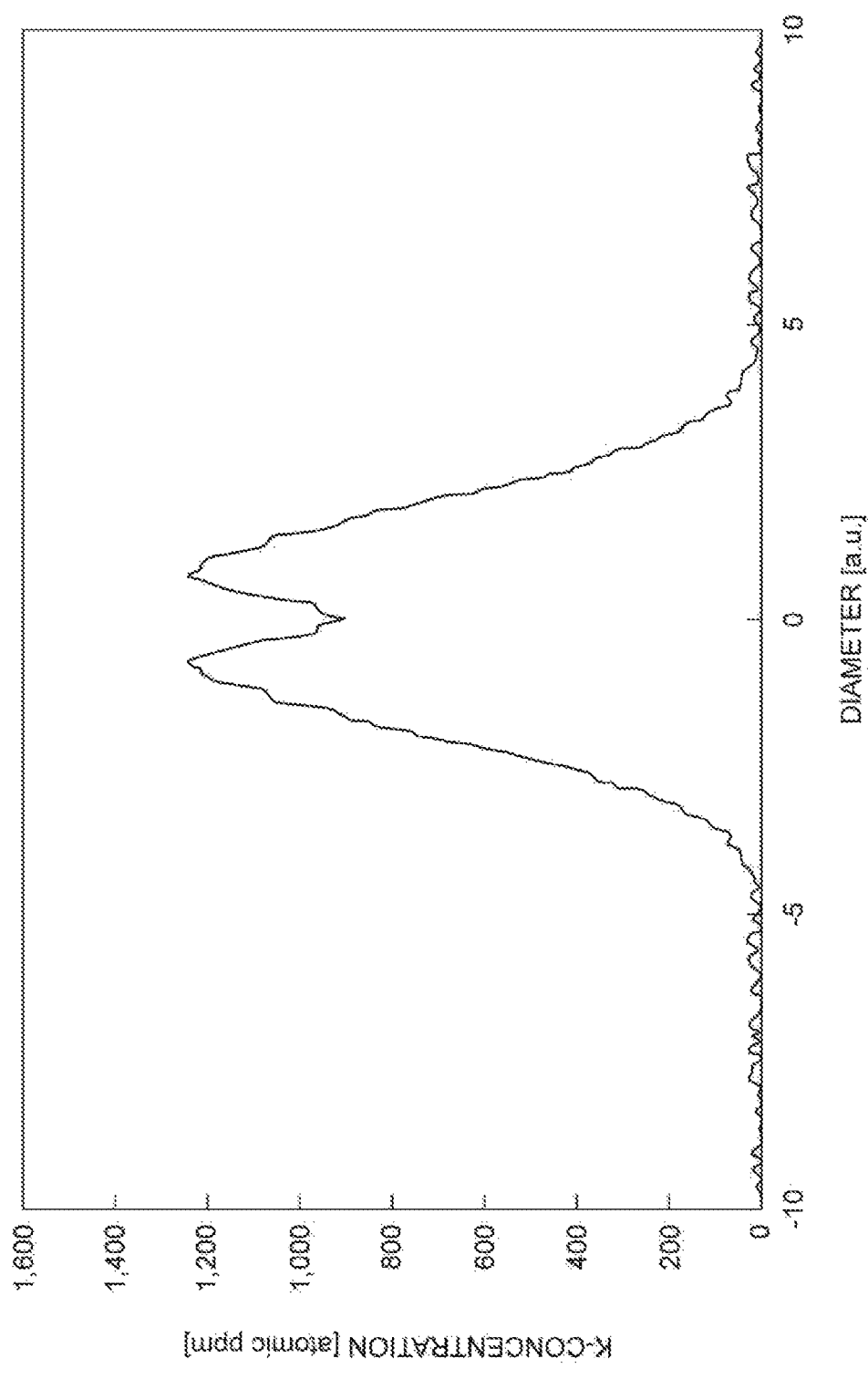
FIG. 3 is an example of the profile of potassium concentration (K-concentration) of a first intermediate rod produced in the first collapse step S25 of the method of manufacturing an optical fiber preform according to Comparative Example (a glass rod produced in the first collapse step S25).

FIG. 3 is an example of the profile of potassium concentration of the first intermediate rod produced in the first collapse step S25 of the method of manufacturing an optical fiber preform in Comparative Example. In the example shown in FIG. 3, the potassium concentration peak is 1,250 atomic ppm. In a core preform forming a part of the manufactured optical fiber preform, the mean potassium concentration is 8 atomic ppm, and the potassium concentration peak is 830 atomic ppm. The transmission loss of the manufactured optical fiber at a wavelength of 1550 nm is 0.154 dB/km.

By each of the method of manufacturing an optical fiber preform according to the present embodiment (twice K-doping method) and the method of manufacturing an optical fiber preform in Comparative Example (one time K-doping method) as described above, the mean potassium concentration in a core preform forming a part of an optical fiber preform is set to various values, and a plurality of optical fiber preform samples is manufactured. The measurement values of the potassium concentration peak in each core preform of a plurality of the manufactured samples and the transmission loss of an optical fiber at a wavelength of 1550 nm are shown in FIGS. 4 to 6.

Figure 4:
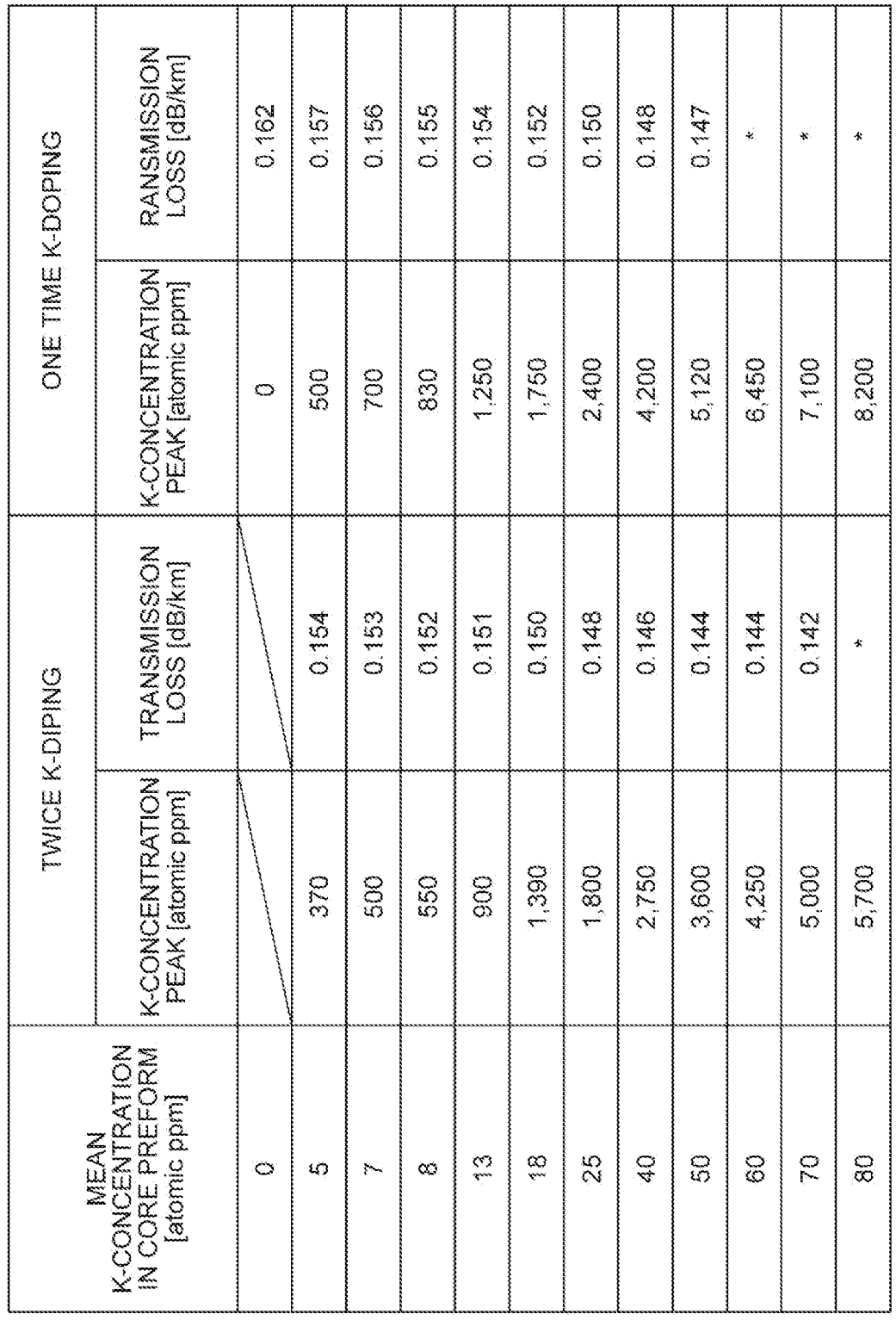
FIG. 4 is about a plurality of optical fiber preform samples according to the present embodiment and a plurality of optical fiber preform samples according to Comparative Example, and a table summarizing the mean potassium concentration (mean K-concentration) in a core preform (which forms a part of an optical fiber preform), the potassium concentration peak (K-concentration peak) in such core preform, and the transmission loss of an optical fiber at a wavelength of 1550 nm.

FIG. 4 is about a plurality of optical fiber preform samples manufactured by the twice K-doping method (the present embodiment) and a plurality of optical fiber preform samples manufactured by the one time K-doping method (Comparative Example), and a table summarizing the mean potassium concentration in a core preform (which forms a part of an optical fiber preform), the potassium concentration peak in such core preform and the transmission loss of an optical fiber at a wavelength of 1550 nm. In this table, the "*" mark indicates that it was difficult to obtain a fiber because glass crystallization often occurred in a core preform.

Figure 5:
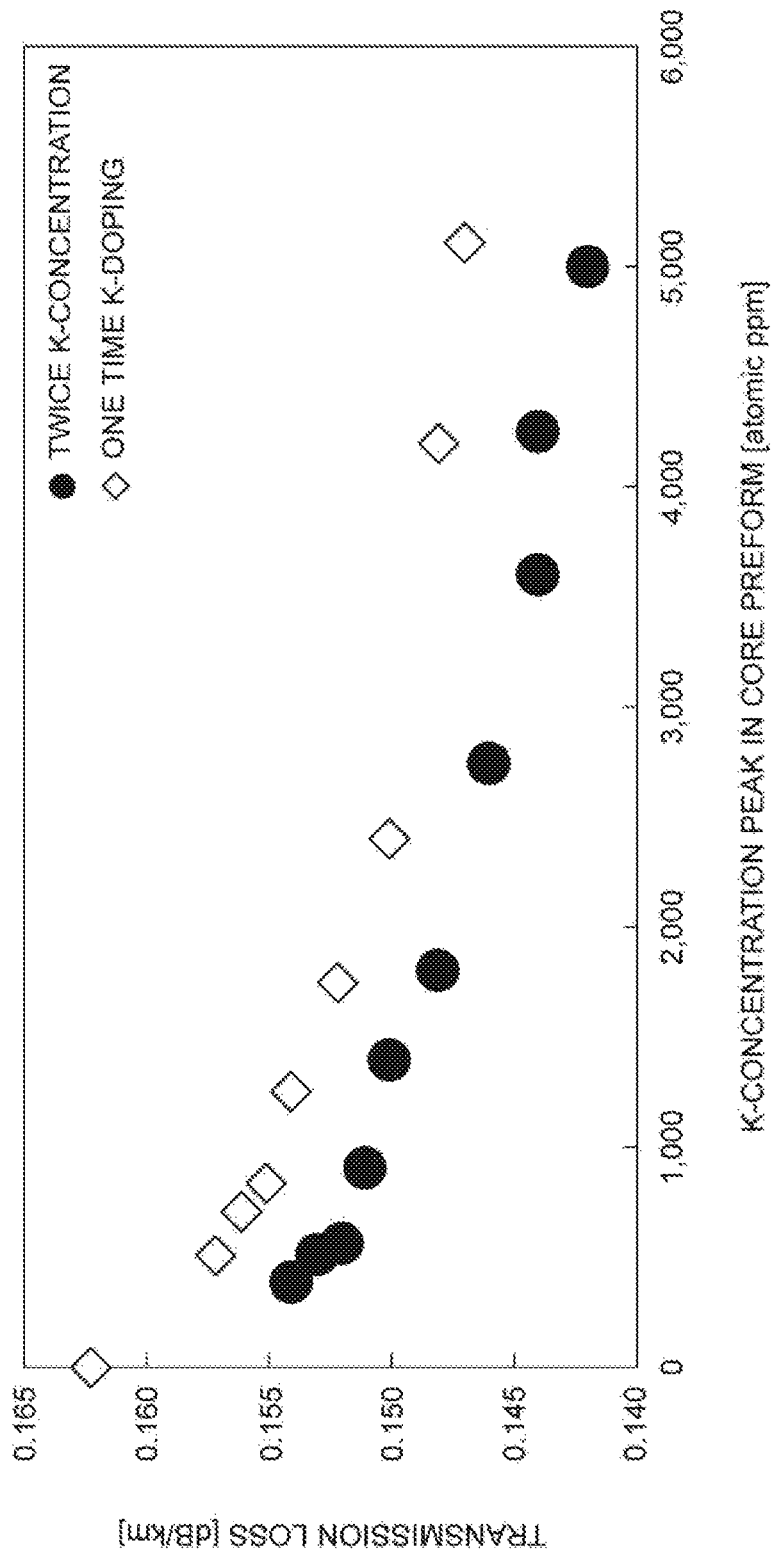
FIG. 5 is about a plurality of optical fiber preform samples according to the present embodiment and a plurality of optical fiber preform samples according to Comparative Example, and a graph showing a relationship of the potassium concentration peak (K-concentration peak) in a core preform (which forms a part of an optical fiber preform), and the transmission loss of an optical fiber at a wavelength of 1550 nm.

FIG. 5 is about a plurality of optical fiber preform samples manufactured by the twice K-doping method (the present embodiment) and a plurality of optical fiber preform samples manufactured by the one time K-doping method (Comparative Example), and a graph showing a relationship between the potassium concentration peak in a core preform and the transmission loss of an optical fiber at a wavelength of 1550 nm. FIG. 6 is about a plurality of optical fiber preform samples manufactured by the twice K-doping method (the present embodiment) and a plurality of optical fiber preform samples manufactured by the one time K-doping method (Comparative Example), and a graph showing a relationship between the mean potassium concentration in a core preform and the potassium concentration peak in the core preform. In each of FIGS. 5 and 6, the "●" mark indicates the examples of the optical fiber preform manufactured by the twice K-doping method of the present embodiment, and the "◇" mark indicates the examples of the optical fiber preform manufactured by the one time K-doping method of Comparative Example.

Figure 6:
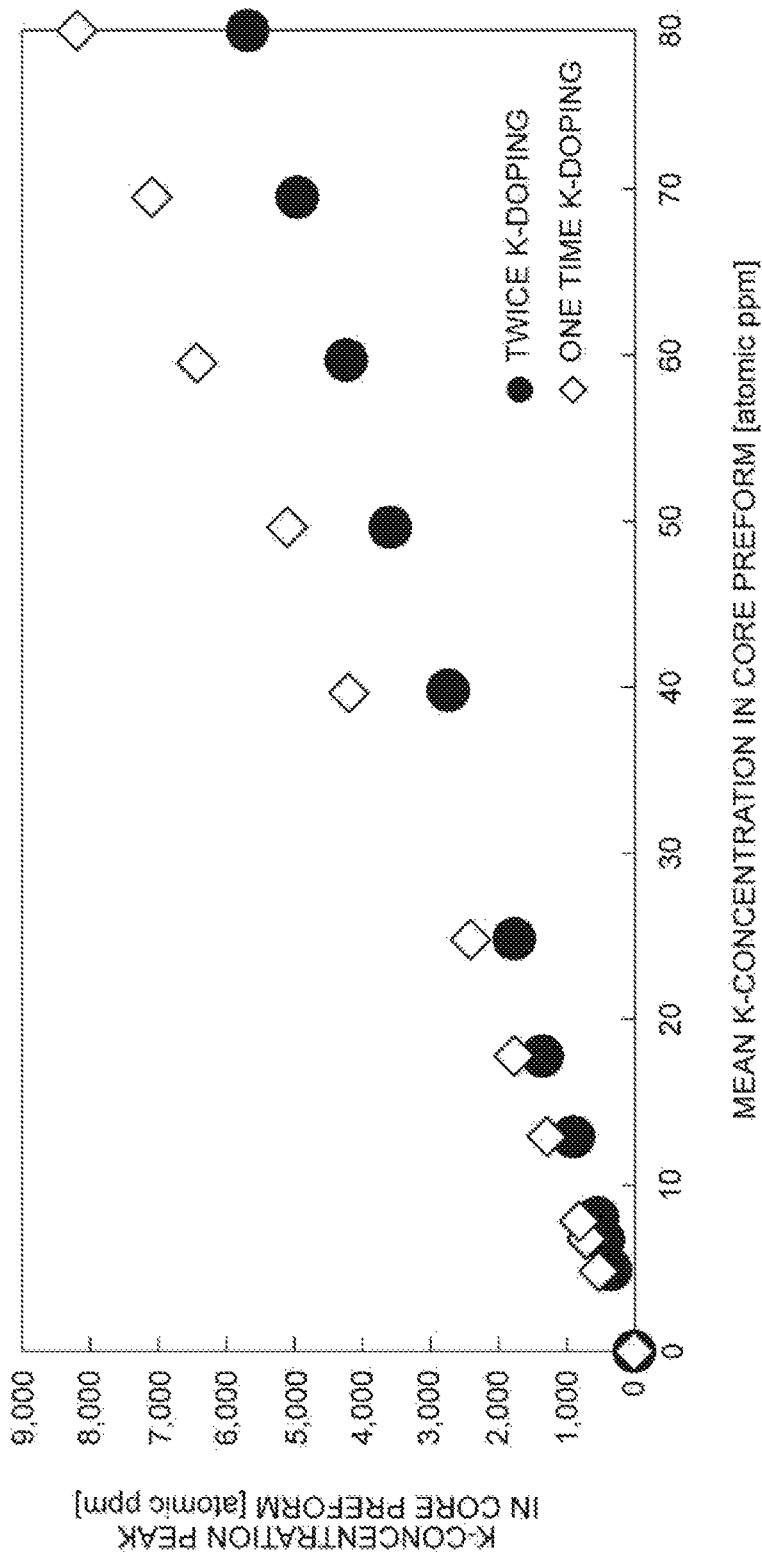
FIG. 6 is about a plurality of optical fiber preform samples according to the present embodiment and a plurality of optical fiber preform samples according to Comparative Example, and a graph showing a relationship of the mean potassium concentration (mean K-concentration) in a core preform (which forms a part of an optical fiber preform), and the potassium concentration peak (K-concentration peak) in such core preform.

As can be seen from these FIGS. 4 to 6, when the potassium concentration peak of a core preform is high, transmission loss can be reduced. As can be seen from the comparison of a plurality of optical fiber preform samples according to the present embodiment and a plurality of optical fiber preform samples according to Comparative Example, even when the potassium concentration peaks are identical, the transmission loss of a drawn optical fiber can be reduced by manufacturing an optical fiber preform by the twice K-doping method of the present embodiment.

When the potassium concentration peak in a core preform is above 5,000 atomic ppm, crystals are easily generated in the core preform, and thus drawing is difficult. According to the present embodiment, the potassium concentration peak in a core preform is kept to 5,000 atomic ppm or less, and simultaneously the mean potassium concentration in the whole core preform can be high compared to that of Comparative Example.

When the chlorine concentration of first and second glass pipes (both to which an alkali metal element has been added) used in the twice K-doping method in the present embodiment, and a first glass pipe (to which an alkali metal element has been added) used in the one time K-doping method in Comparative Example is less than 10 atomic ppm, the transmission loss of an optical fiber manufactured using these glass pipes increases. It is thought that this is because glass defects often occur in the step of drawing an optical fiber preform. On the other hand, when the chlorine concentration is 600 atomic ppm or more in these glass pipes, the frequency of defective products increases. It is thought this is because, when manufacturing an optical fiber preform, an alkali metal element and chlorine element react to easily generate a chloride, which causes crystals. Therefore, the chlorine concentration in these glass pipes is desirably 10 atomic ppm or more and 600 atomic ppm or less, and more desirably 30 atomic ppm or more and 400 atomic ppm or less. When the mean chlorine concentration in a first glass pipe and a second glass pipe is within the above-mentioned suitable range, they can be used in the present embodiment.

As the third collapse step S12 in the method of manufacturing an optical fiber preform according to the present embodiment (twice K-doping method) and the second collapse step S27 in the method of manufacturing an optical fiber preform according to Comparative Example (one time K-doping method), it is preferred that a third core portion formed from silica glass with a mean chlorine concentration of 2,000 atomic ppm or more and 15,000 atomic ppm or less be added to the outer side of a first core portion to which an alkali metal element has been added. By adding a third core portion as described above, the transmission loss of a drawn optical fiber can be reduced. It is thought that this is because glass defects, which occur during drawing and occur in an alkali metal-added glass region, are repaired by chlorine. However, when the chlorine concentration is too high, a chloride causing crystallization is generated during the process of manufacturing an optical fiber preform after adding a glass region to which a high concentration of chlorine has been added. Therefore, the chlorine concentration of a third core portion is desirably 15,000 atomic ppm or less and more desirably 5,000 atomic ppm or more and 14,000 atomic ppm or less.

In the core preform forming a part of an optical fiber preform according to the present embodiment, a second core portion having a chlorine concentration of 10 atomic ppm or more and 600 atomic ppm or less and an alkali metal concentration of 10 atomic ppm or less is preferably provided between a first core portion having a chlorine concentration of 10 atomic ppm or more and 600 atomic ppm or less and comprising an alkali metal element and a third core portion having a chlorine concentration of 2,000 atomic ppm or more and 15,000 atomic ppm or less and an alkali metal element of 10 atomic ppm or less. The second core portion and the third core portion do not substantially comprise an alkali metal element. This is to prevent a case in which, when an alkali metal element which has been added to a first core portion, is diffused into a third core portion with a high chlorine concentration, the alkali metal element becomes a chloride, which becomes a crystal core portion, in the heating step such as the drawing step carried out after the step of manufacturing a core preform.

Therefore, the optical fiber preform 1 according to the present embodiment is an optical fiber preform which comprises a core preform 10 to be a core portion region of an optical fiber and a cladding portion 20 to be a cladding portion region of an optical fiber as shown in the cross-sectional view in FIG. 7 and is formed from silica-based glass, wherein the optical fiber preform has the features as described below. That is, the core preform 10 has, in turn from the central axis AX along the radial direction r, at least a first core portion 11 comprising such central axis AX (the center region of the core preform 10), a second core portion 12 in contact with the outer side of the first core portion 11 (the intermediate region of the core preform 10), and a third core portion 13 in contact with the outer side of the second core portion 12 (the peripheral region of the core preform 10). In the first core portion 11, the peak alkali metal element concentration is 500 atomic ppm or more and 5,000 atomic ppm or less, and the chlorine concentration is 10 atomic ppm or more and 600 atomic ppm or less. In the second core portion 12, the alkali metal element concentration is 10 atomic ppm or less, and the chlorine concentration is 10 or more and 600 atomic ppm or less. In the third core portion 13, the alkali metal element concentration is 10 atomic ppm or less, and the chlorine concentration is 2,000 atomic ppm or more. That is, the refractive index of the first core portion 11 and the refractive index of the second core portion 12 are almost identical, and the refractive index of the third core portion 13 is higher than the refractive indices of the first and second core portions 11 and 12. In addition, fluorine is added to a cladding portion 20, and the refractive index is set to be lower than each refractive index of the first to third core portions 11 to 13.

Figure 7:
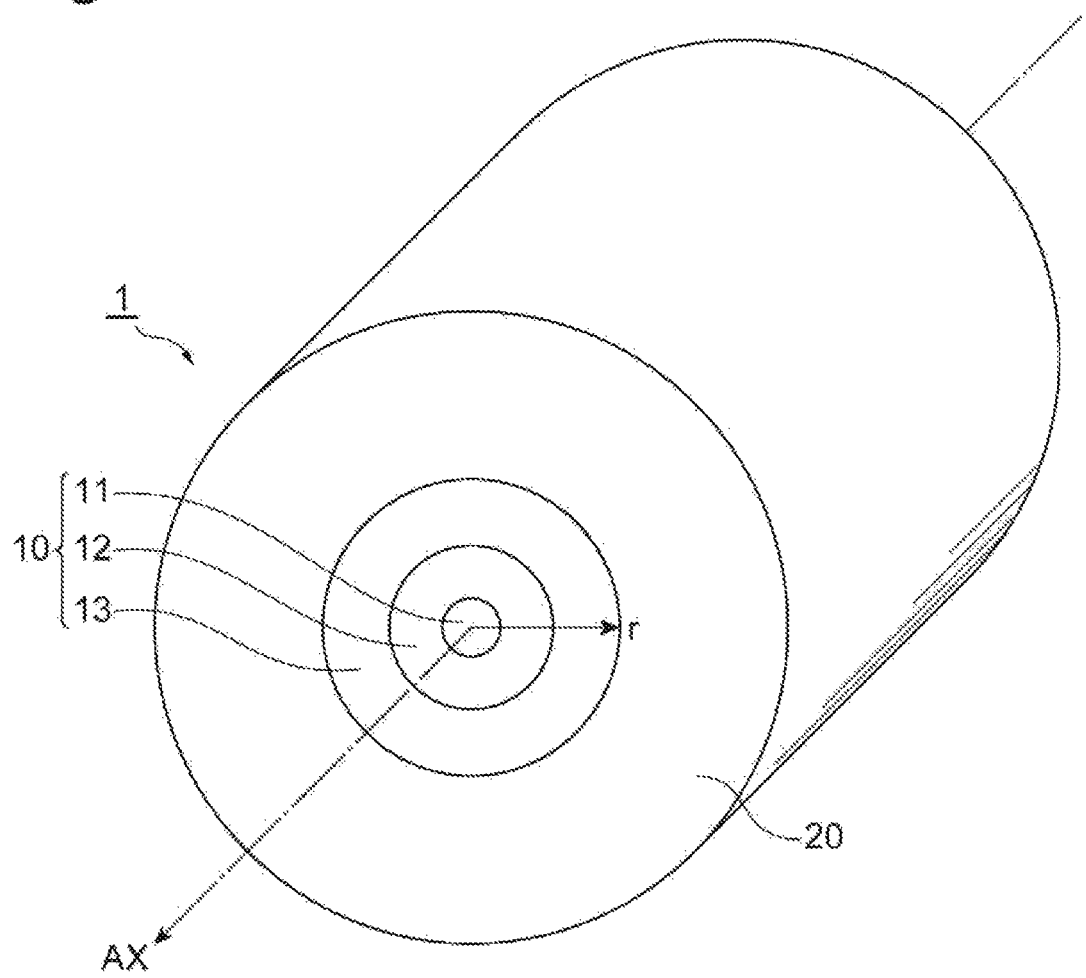
FIG. 7 is a cross-sectional view of an optical fiber preform according to the present embodiment.
Figure 8:
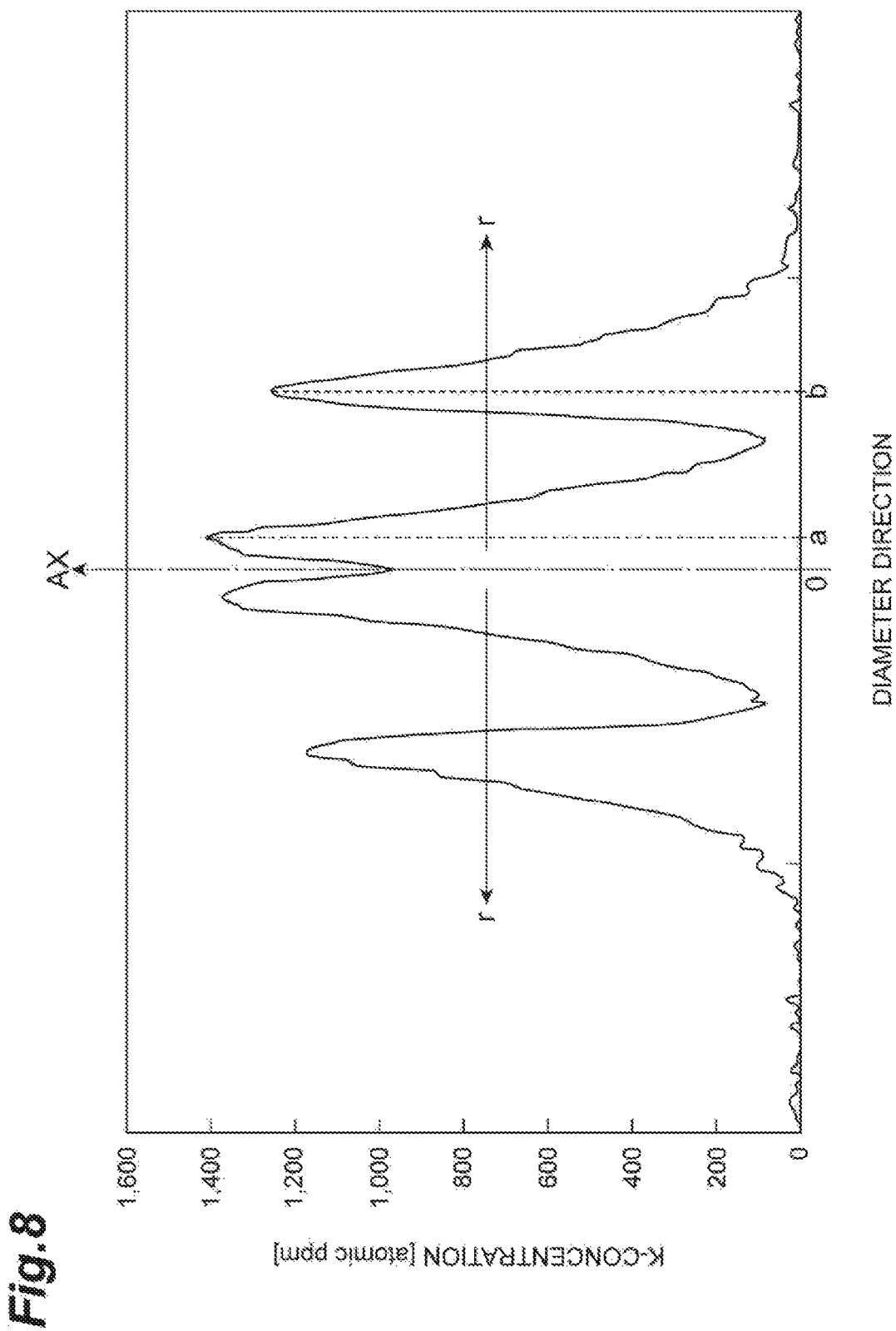
FIG. 8 is the profile of potassium concentration (K-concentration) along the radial direction in a core preform, especially a first core portion.

FIG. 8 shows an example of the profile of alkali metal element concentration in the core preform 10 included in the optical fiber preform 1 shown in FIG. 7. Specifically, the profile of the concentration in FIG. 8 is the profile of K-concentration along the radial direction r of such core preform 10 (the direction from the central axis AX to the outer peripheral surface of such core preform 10 in the cross section of such core preform 10). In the present embodiment, the doping of potassium element (K-doping) is carried out in the first doping step S2 and the second doping step S7 as shown in FIG. 1, and thus the profile of the concentration in the first core portion 11 has a form in which two points, one which is adjacent to the central axis AX and is separated for a distance a from the center of the cross section (the intersection point of the cross section of the first core portion and the central axis AX), and the peripheral portion of the first core portion 11 which is separated for a distance b, are local maxima.

In the first collapse step S5 and the second collapse step S10 in the method of manufacturing an optical fiber preform according to the present embodiment, a glass pipe having an alkali metal element added to the inner surface is preferably subjected to collapse or rod-in-collapse in an oxygen atmosphere. It is supposed that this is because many point defects typified by oxygen deficient center (ODC, ≡Si—Si≡) remain in glass in an atmosphere with a little oxygen, which cause an increase in transmission loss of an optical fiber. Therefore, glass defects easily occur especially in a glass portion to which an alkali metal element has been added, and thus it is preferred that the concentration of oxygen molecule contained in glass be 30 mol·ppb or more in a part or the whole of a glass region, in which the alkali metal concentration is 100 atomic ppm or more. On the other hand, when the oxygen residual amount is too much, it is supposed that glass defects such as non-bridging oxygen hole center (NBOHC, ≡Si—O.) easily occur, and thus it is preferred that the concentration of oxygen molecule contained in glass be 200 mol·ppb or less.

REFERENCE SIGNS LIST

1 Optical fiber preform
10 Core preform (Third core rod)
11 First core portion
12 Second core portion
13 Third core portion
20 Cladding portion

The invention claimed is:

1. An optical fiber preform, comprising:
a core preform including:
a first core portion with a maximum alkali metal element concentration of 500 atomic ppm or more and 5,000 atomic ppm or less, the first core portion having a profile of an alkali metal element concentration along a radial direction of the first core portion, the profile having at least two local maxima points, which include a first local maximum point and a second local maxima point on a circumference around the first local maximum point,
a second core portion surrounding the first core portion, the second core portion having the alkali metal element concentration of 10 atomic ppm or less, and
a third core portion surrounding the second core portion, the third core portion having the alkali metal element concentration of 10 atomic ppm or less and the chlorine concentration of 2,000 atomic ppm or more and 15,000 atomic ppm or less, wherein the core preform has a mean alkali metal element concentration of 7 atomic ppm or more and 70 atomic ppm or less, and
a cladding portion surrounding the core preform, the cladding portion having a refractive index lower than each refractive index of the first to third core portions.

2. The optical fiber preform according to claim 1, wherein the alkali metal element is potassium.

3. The optical fiber preform according to claim 1, wherein the chlorine concentration of the first core portion and second core portion is 10 atomic ppm or more and 600 atomic ppm or less.

4. The optical fiber preform according to claim 1, wherein the core preform includes a region containing the alkali metal element having a concentration of 100 atomic ppm or more, and in a part or the whole of the region an oxygen molecule concentration is 30 mol·ppb or more and 200 mol·ppb or less.

5. The optical fiber preform according to claim 1, wherein a mean concentration of OH group in the core preform is 0.01 wt·ppm or less.

* * * * *